United States Patent
Silva et al.

(10) Patent No.: US 12,366,499 B2
(45) Date of Patent: Jul. 22, 2025

(54) METHODS OF DETERMINING FLOW RATES OF GAS LEAKS IN A PRESSURIZED GAS SYSTEM

(71) Applicant: DUKE ENERGY CORPORATION, Charlotte, NC (US)

(72) Inventors: Adam Silva, Charlotte, NC (US); Travis Bronson, Charlotte, NC (US)

(73) Assignee: DUKE ENERGY CORPORATION, Charlotte, NC (US)

( * ) Notice: Subject to any disclaimer, the term of this patent is extended or adjusted under 35 U.S.C. 154(b) by 405 days.

(21) Appl. No.: 18/168,136

(22) Filed: Feb. 13, 2023

(65) Prior Publication Data
US 2023/0266195 A1 Aug. 24, 2023

Related U.S. Application Data

(60) Provisional application No. 63/312,526, filed on Feb. 22, 2022.

(51) Int. Cl.
*G01M 3/22* (2006.01)
*F17D 5/00* (2006.01)
(Continued)

(52) U.S. Cl.
CPC .......... *G01M 3/22* (2013.01); *F17D 5/005* (2013.01); *F17D 5/02* (2013.01); *G06T 7/50* (2017.01);
(Continued)

(58) Field of Classification Search
CPC .... G06V 20/46; G06V 10/7715; G06V 10/24; G06V 10/242; G06V 10/245;
(Continued)

(56) References Cited

U.S. PATENT DOCUMENTS

| 2022/0034742 A1* | 2/2022 | Asano ................... G01J 5/0014 |
| 2022/0128388 A1* | 4/2022 | Raduchel ............... G01F 1/666 |

(Continued)

FOREIGN PATENT DOCUMENTS

| JP | 2002323399 | * 11/2002 | .............. G01M 3/06 |
| JP | 2009186238 | * 8/2009 | .............. G01M 3/22 |

(Continued)

OTHER PUBLICATIONS

Baroudi et al, ("Pipeline Leak Detection Systems and Data Fusion: A Survey", IEEE 2019) (Year: 2019).*

*Primary Examiner* — Amara Abdi
(74) *Attorney, Agent, or Firm* — Myers Bigel, P.A.

(57) ABSTRACT

A method of determining a flow rate of a gas leak in a pressurized gas system includes applying a liquid soap solution to a region of a component, and capturing, via a camera of a portable electronic device, a plurality of sequential images of bubbles formed in the region by an interaction between the liquid soap solution and a gas leak from the component. The plurality of images are analyzed by a first algorithm executed by a processor to determine a total area of the bubbles in the region produced by the leak. A flow rate of the gas leak is then determined via a second algorithm executed by the processor based on the total area of bubbles in the region, a size of the component, and a pressure of the gas.

20 Claims, 6 Drawing Sheets

(51) Int. Cl.
*F17D 5/02* (2006.01)
*G06T 7/50* (2017.01)
*G06T 7/62* (2017.01)

(52) U.S. Cl.
CPC ...... *G06T 7/62* (2017.01); *G06T 2207/10016* (2013.01); *G06T 2207/20081* (2013.01)

(58) Field of Classification Search
CPC .... G06V 10/247; G06V 10/248; G06V 10/74; G06V 20/52; G06V 10/46; G06T 7/73; G06T 2207/10016; G06T 2207/30244; G06T 2207/30252; G06T 7/30; G06T 1/0014; G06T 7/70; G01C 11/06; G05D 1/0246; G06F 3/0481; G06F 18/20
See application file for complete search history.

(56) References Cited

U.S. PATENT DOCUMENTS

| | | | | |
|---|---|---|---|---|
| 2022/0373423 | A1* | 11/2022 | Høydahl Sørli | .... G01M 3/3254 |
| 2023/0011503 | A1* | 1/2023 | Duke | ........ G06F 16/55 |
| 2023/0073702 | A1* | 3/2023 | Xiong | ........ H04N 7/183 |
| 2024/0255420 | A1* | 8/2024 | Asano | ........ G06T 7/0004 |

FOREIGN PATENT DOCUMENTS

| | | | | |
|---|---|---|---|---|
| JP | 2012058093 | * | 3/2012 | ........ G01M 3/36 |
| WO | WO 2016/174370 | * | 3/2016 | ........ G01M 3/24 |

* cited by examiner

METHODS OF DETERMINING FLOW RATES OF GAS LEAKS IN A PRESSURIZED GAS SYSTEM

RELATED APPLICATION

This application claims the benefit of and priority to U.S. Provisional Patent Application No. 63/312,526 filed Feb. 22, 2022, the disclosure of which is incorporated herein by reference as if set forth in its entirety.

FIELD OF THE INVENTION

The present invention relates generally to gas leaks and, more particularly, to the quantification of gas leaks.

BACKGROUND OF THE INVENTION

Conventional devices for measuring the flow rate of natural gas leaks may not accurately measure leaks below one standard cubic feet per hour ("SCFH"), especially below 0.5 SCFH. Rather, a conventional technique for measuring such leaks may require a human technician to observe a bubble that results from a soaping procedure on a leaking pipe and to then manually check a table that correlates the size of the bubble with a flow rate.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Embodiments of the present invention provide a method of determining a flow rate of a gas leak in a pressurized gas system, such as a natural gas system, a propane system, or a refrigerant system. The method includes applying a liquid soap solution to a region of a component of the pressurized gas system, such as a pipe, valve, or fitting, and capturing, via a camera of a portable electronic device, a plurality of sequential images of bubbles formed in the region by an interaction between the liquid soap solution and a gas leak from the component. In some embodiments, the plurality of images are a digital video having a duration of at least 10 seconds.

The plurality of images are analyzed by a first algorithm executed by a processor to determine a total area of the bubbles in the region produced by the leak. The first algorithm is a trained computer vision machine learning model. A flow rate of the gas leak is then determined via a second algorithm executed by the processor based on the total area of bubbles in the region, a size of the component, and a pressure of the gas. The second algorithm is a trained machine learning model, such as a random forest machine learning model.

In some embodiments, the portable electronic device may include the processor. In other embodiments, the processor may be remotely located, for example in the cloud. In some embodiments, the processor is configured to determine a distance that the camera was spaced apart from the region of the component when capturing the plurality of images, and then account for this distance when determining the total area of bubbles in the region.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

DETAILED DESCRIPTION

Figure 1A:
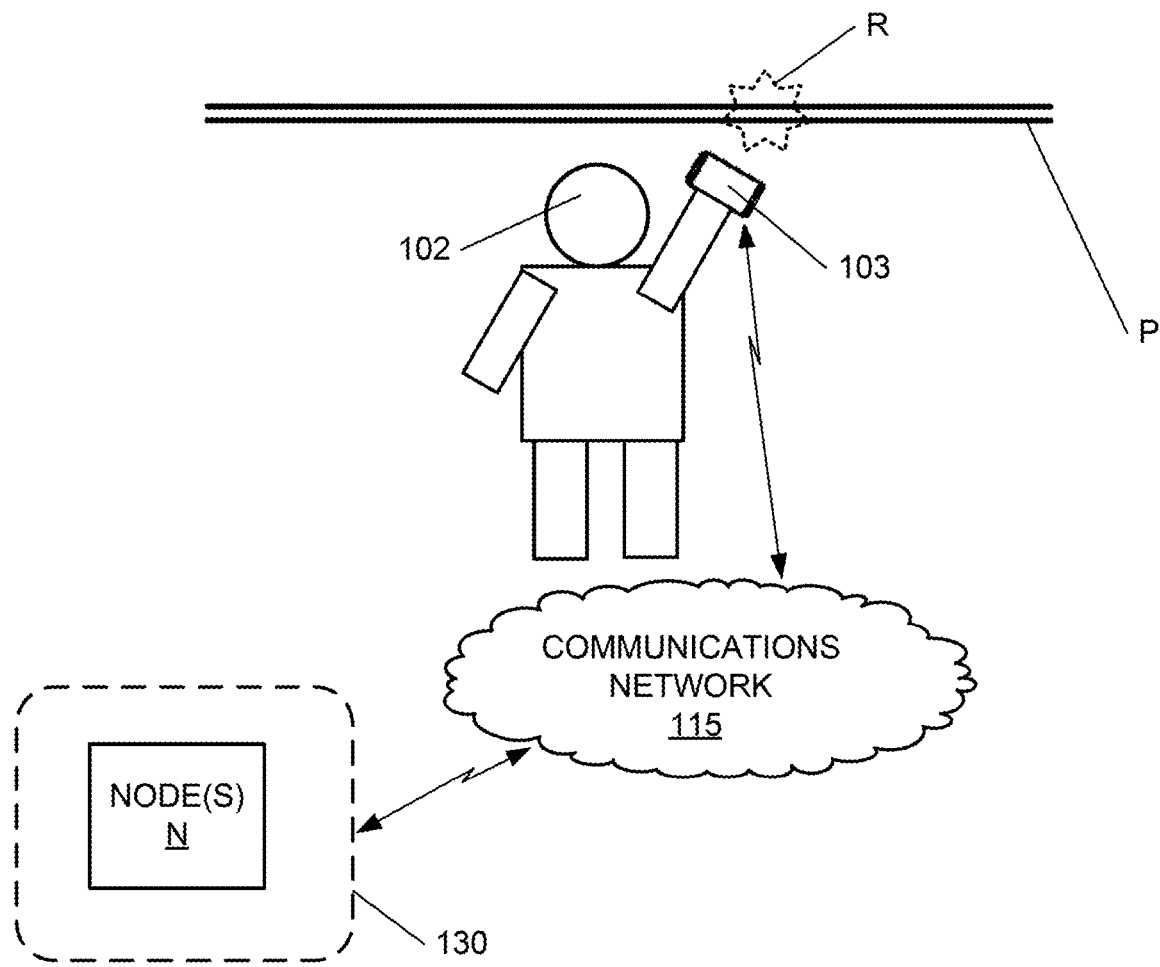
FIG. 1A is a schematic illustration of a technician using a portable electronic device to determine the flow rate of a gas leak, according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines illustrate optional features or operations unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

It will be understood that although the terms first, second, third, etc., may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

The terms "about" and "approximately", as used herein with respect to a value or number, means that the value or number can vary by +/−twenty percent (20%).

According to the present invention, a digital image of bubbles produced as a result of a soaping procedure may be used to automatically determine volumetric flow rate of a leak in SCFH. For example, a portion of the image may include a pipe having the bubble(s) thereon, and the pipe may be used as a reference point to correct (e.g., adjust) for camera distance from the bubble(s). As a size (e.g., diameter) of the pipe may be known, a total bubble cluster size may be determined in terms of pixel area, corrected by the pipe size. As an example, the size (e.g., length) of individual pixels in the image may be used to determine the total bubble cluster size. The total bubble cluster size is the total (i.e., aggregate) size of an entire group of bubbles that are on the pipe.

By using a digital image to determine the flow rate of a gas leak (e.g., a natural gas leak, a refrigerant gas leak, etc.), embodiments of the present invention may be faster and/or more accurate than conventional manual techniques. For example, because they are not as reliant on user input(s) as conventional manual techniques, embodiments of the present invention may reduce user error.

Example embodiments of the present invention will be described in greater detail with reference to the figures. FIG. 1A is a schematic illustration of a human user 102 (e.g., a technician) that uses a portable electronic device 103 to determine the flow rate of a gas leak. In some embodiments, the leak may be in a region R of a natural gas pipe P, which may be connected to one or more customers of a utility company. For example, the pipe P may be on the premises of a residential or commercial customer of the utility company.

The electronic device 103 may, in some embodiments, communicate with one or more nodes N (e.g., servers) at a data center (or office) 130. For example, the communications may occur via a communications network 115, which may include one or more wireless or wired communications networks, such as a local area network (e.g., Ethernet or Wi-Fi), a cellular network, and/or a fiber (such as a fiber-optic) network. The electronic device 103 may be provided at various locations, and may comprise a laptop computer, a tablet computer, a smartphone, or a dedicated flow-rate measurement device. In some embodiments, a video will be collected via a smartphone or tablet computer and then sent to a cloud computing network (e.g., Microsoft Azure) where the processing of the video will take place (i.e., the pipe and bubbles identified by the AI and then the flow rate derived by another AI).

Figure 1B:
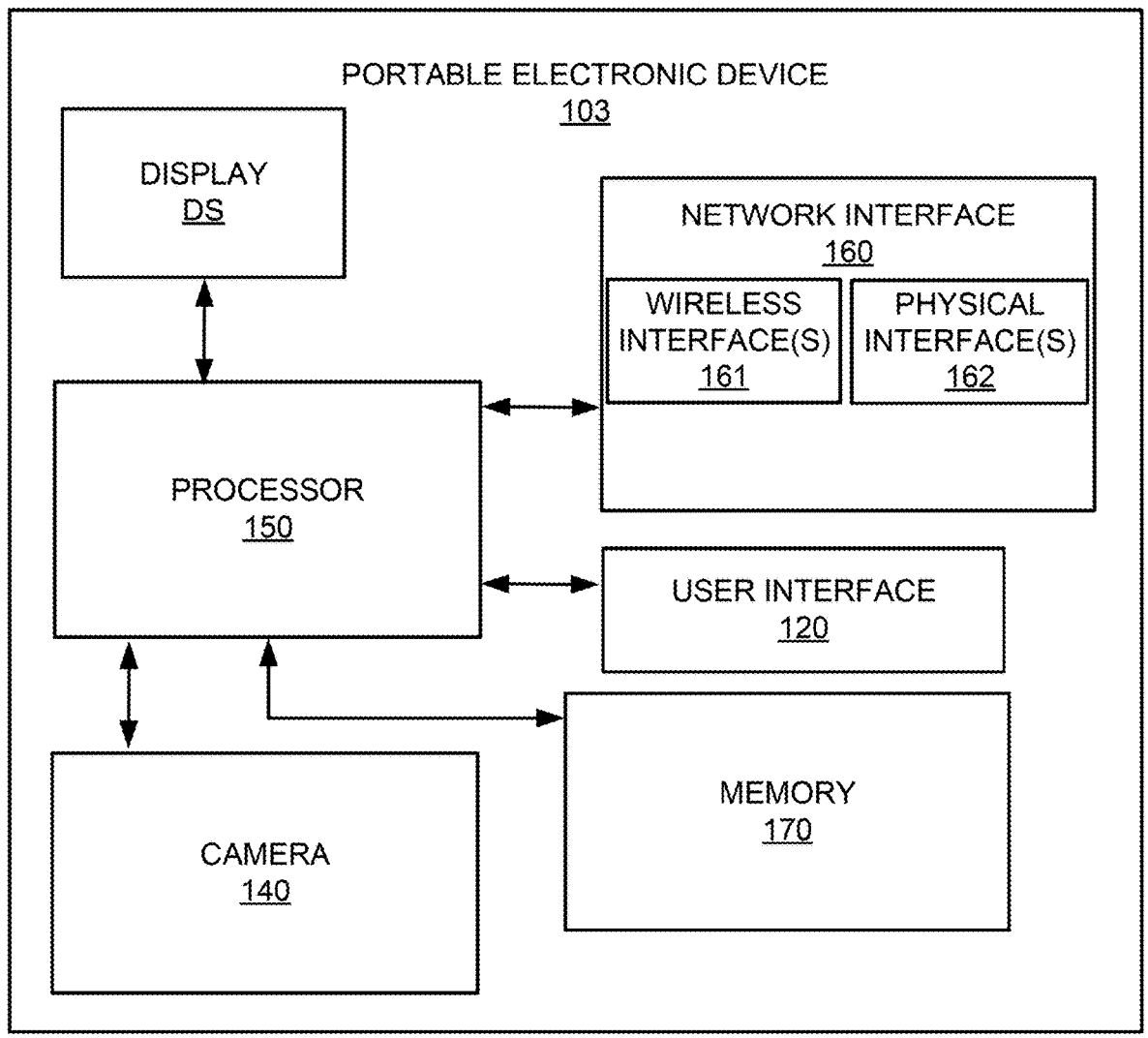
FIG. 1B is a block diagram of the portable electronic device of FIG. 1A.

FIG. 1B is a block diagram of the portable electronic device 103 of FIG. 1A. The electronic device 103 may include a user interface 120, a camera 140, a processor 150, a network interface 160, a memory 170, and a display DS. In some embodiments, the display DS may be a touchscreen display that may be integrated with the user interface 120. The camera 140 may be a digital camera that is configured to capture digital video and/or digital still images. The processor 150 may be coupled to the display DS, the user interface 120, the camera 140, network interface 160, and/or the memory 170. The processor 150 may be configured to communicate with a node N (FIG. 1A) and/or the communication network 115 (FIG. 1A) via the network interface 160.

For example, the network interface 160 may include one or more wireless interfaces and/or one or more physical interfaces 162. The wireless interface(s) 161 may comprise wireless communications circuitry, such as BLUETOOTH® circuitry, cellular communications circuitry that provides a cellular wireless interface (e.g., 4G/5G/LTE, other cellular), and/or Wi-Fi circuitry. The physical interface(s) 162 may comprise wired communications circuitry, such as wired Ethernet, serial, and/or USB circuitry.

Figure 1C:
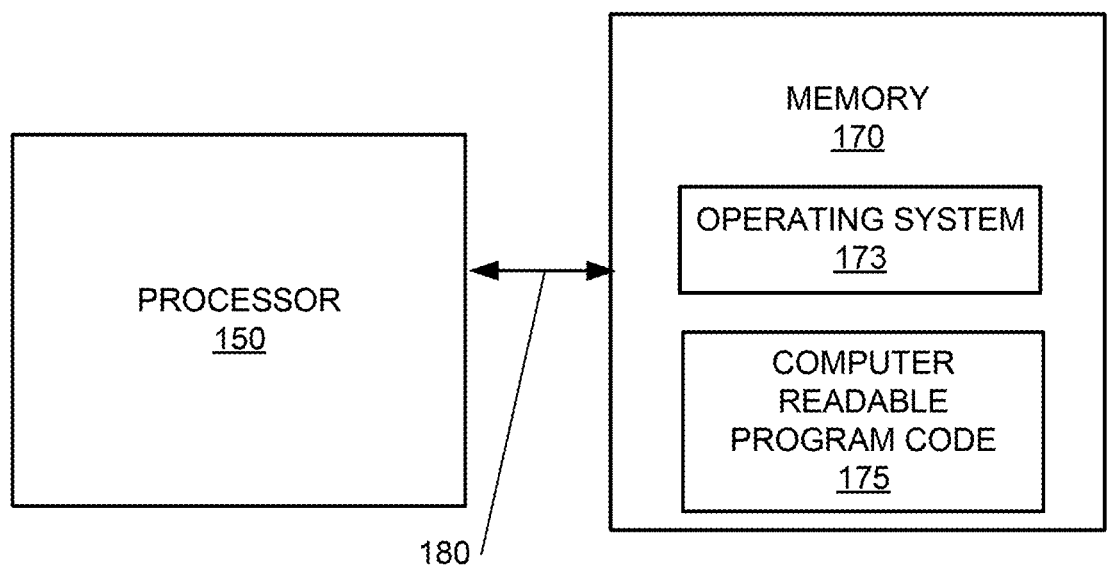
FIG. 1C is a block diagram that illustrates details of an example processor and memory that may be used in accordance with embodiments of the present invention.

FIG. 1C is a block diagram that illustrates details of an example processor 150 and memory 170 that may be used in accordance with various embodiments. The processor 150 communicates with the memory 170 via an address/data bus 180. The processor 150 may be, for example, a commercially available or custom microprocessor. Moreover, the processor 150 may include multiple processors. The memory 170 may be a non-transitory computer readable storage medium and may be representative of the overall hierarchy of memory devices containing the software and data used to implement various functions of the portable electronic device 103 (FIGS. 1A and 1B) as described herein. The memory 170 may include, but is not limited to, the following types of devices: cache, ROM, PROM, EPROM, EEPROM, flash, static RAM ("SRAM"), and dynamic RAM ("DRAM"). As shown in FIG. 1C, the memory 170 may hold various categories of software and data, such as computer readable program code 175 and/or an operating system 173. The operating system 173 controls operations of the electronic device 103. In some embodiments, the operating system 173 may manage the resources of the electronic device and may coordinate execution of various programs by the processor 150. For example, the computer readable program code 175, when executed by a processor 150 of the electronic device 103, may cause the processor 150 to perform any of the operations illustrated in the flowchart of FIG. 2.

Figure 2:
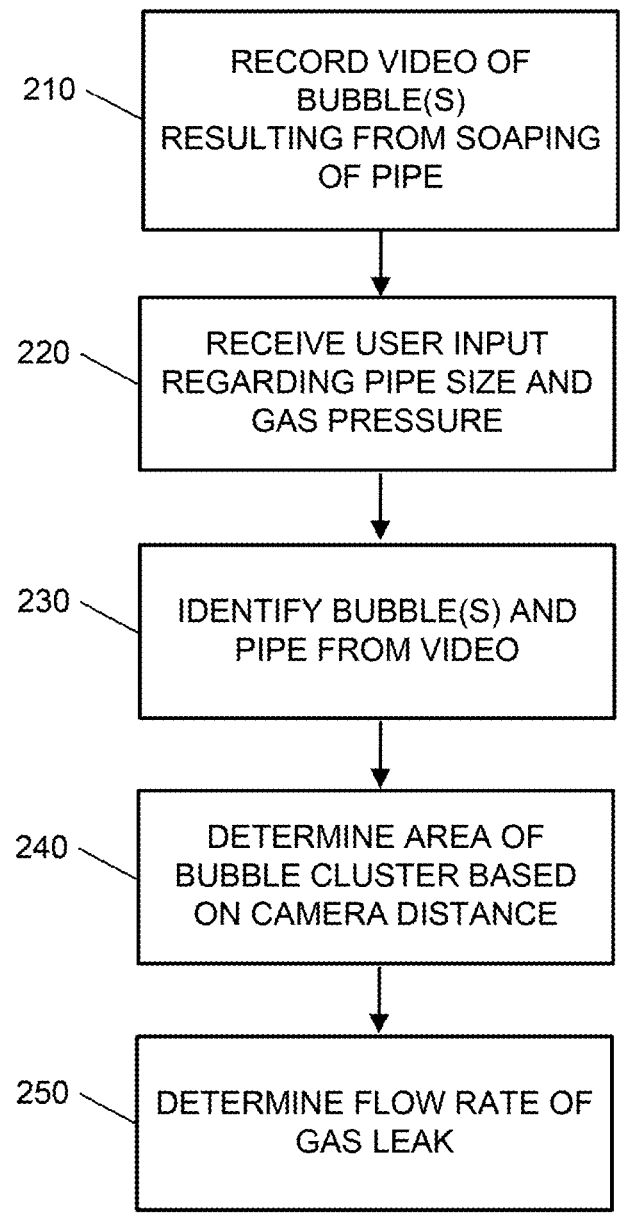
FIG. 2 is a flowchart of operations for determining the flow rate of a gas leak, according to embodiments of the present invention.

FIG. 2 is a flowchart of operations of determining the flow rate of a gas leak according to some embodiments of the present invention. Referring to FIG. 2, the operations include recording/capturing (Block 210), via the camera 140 (FIG. 1B), a video and/or still image(s) of bubbles that form as a result of a soaping procedure on a pipe P (FIG. 1A). In some embodiments, the camera 140 is positioned approximately 6 inches from the leak origin. Soaping procedures are well known to those skilled in the art of the present invention and involve applying soapy water (e.g., using dish washing soap) to components (e.g., pipes, fittings, valves, etc.) of a pressurized gas transmission system (e.g., natural gas, propane, refrigerant, etc.). The presence of bubbles after the application of the soapy water indicates a leak.

Embodiments of the present invention may be utilized with soaping procedures involving a variety of types of soap, without limitation. For example, different types of soaps may be utilized depending on the geographic location. Moreover, in some embodiments of the present invention, a computer vision machine learning model could be trained to adapt to various soap types in various environments and geographic locations.

The video/still image(s) may comprise a digital video having a duration of at least 10 seconds (e.g., typically 10-20 seconds). In some embodiments, one or more digital still images may be derived from the video. Moreover, a user 102 (FIG. 1A) may provide (Block 220) a user input, via the user interface 120 (and/or the display DS, in the case of a touchscreen), that indicates a size (e.g., a diameter) of a region R (FIG. 1A) of the pipe P that is experiencing the leak. In addition, a user input may include the pressure of the system where the leak occurs, e.g., a leak occurring on a fitting after a natural gas regulator on a residential meter set may be 2 pounds per square inch (psi). The user interface 120 may comprise, for example, a button, a keypad, a touchscreen, and/or a microphone. In some embodiments, the electronic device 103 may receive the user input indicating the size of the pipe P after the camera 140 records the bubble(s). In other embodiments, the electronic device 103 may receive the user input before recording the bubble(s).

The pipe P and the bubble(s) are automatically identified (Block 230) from the video/still image(s) by a trained (trained, for example, in Microsoft Azure) computer vision machine learning model (image segmentation) in an automated fashion. Specifically, since the model has been trained, a 10 second image of the video can be sent to the computer vision machine learning model in an automated fashion to identify the segment of the bubble cluster (cluster being the total amount of bubbles produced by the leak and excluding excess bubbles from spraying the soap onto the asset). In addition, the computer vision machine learning model will also identify the pipe segment.

In some embodiments, computer readable program code 175 (FIG. 1C) of the electronic device 103 may contain the computer vision machine learning model that is configured to locate the pipe P and the bubble(s) within the video/still image(s) and calculate an area of the bubble cluster. In other embodiments, the electronic device 103 may transmit, via the network interface 160 (FIG. 1B), the video/still image(s) to one or more nodes N (FIG. 1A), and the node(s) N may locate the pipe P and the bubble(s) within the video/still image(s) and calculate an area of the bubble cluster via a computer vision machine learning model executed at the one or more nodes N. For example, a machine-learning (i.e., artificial-intelligence ("AI") including computer-vision) model can be trained to identify and/or classify the pipe P. This may be done by providing a computer vision machine learning model a representative sample of images that have been labeled using specific annotation software that enable one to trace the items and then relate those traces to a label (in this case the label is a pipe) in an image that the data scientist wishes the computer vision machine learning model to be able to identify in an automated fashion. Once those images are labeled, the image itself and label information are shown many times in different orientations and with different filters applied to the computer vision machine learning model repeatedly over training iterations. This training process is where machine learning takes over and the computer vision machine learning model learns the attributes it needs, to identify the labels to be learned.

In response to identifying the pipe P and the bubble(s), the area of the bubble cluster is determined by the computer vision machine learning model (Block 240). The total bubble area is determined by the computer vision machine learning model that has been trained using laboratory collected imagery that was then labeled to identify the segment of the bubble area for each of the training images. The total bubble area does not include excess soap that produces bubbles adjacent to or close to but not touching the main bubble cluster produced by the escaping gas.

The determined area size may account for (e.g., correct/adjust/normalize for) a distance that the camera 140 was spaced apart from the region R when the camera 140 captured the video/still image(s). For example, the processor 150 may determine the distance using the camera 140 and/or one or more sensors that can detect distance. As an example, the camera 140 may comprise a camera cluster having two, three, or more cameras that can collectively be used to determine the distance.

In some embodiments, the processor uses a programming language, such as the PYTHON® programming language, to use the user-inputted pipe diameter to compare against the number of pixels of the shortest side of the pipe bounding box (bounding box being the output of the computer vision machine learning model when it predicts the pipe). By taking the length of the minimum side of the bounding box and dividing it by the user inputted diameter of the pipe a pixels/centimeter conversion can be determined. This conversion is then used to normalize the number of pixels within the bubble cluster (the number of pixels in the bubbles cluster is the output of the computer vision machine learning model when it predicts bubbles). This normalization accounts for the distance at which the user holds their device away from the leak through dynamic determination of that conversion. That is, if a user is closer, that conversion will be a smaller number because there are less pixels making up 1 cm and if the user is further away, then the number will be larger because there will be more pixels making up 1 cm.

The flow rate of the leak may be determined (Block 250) by using another trained machine learning model, such as a random forest model, that accounts for the area of the bubble cluster, adjusted for the distance of the camera 140, the size of the pipe P, and the gas pressure. To determine flow rate of a leak (Block 250) using the machine learning model, the total area of bubbles produced from a leak after, for example, 10 seconds is needed. The size of the pipe that the bubbles are produced on, and the working pressure of the gas in the pipe is needed, also. Once the computer vision models determine the bubble cluster area and the pipe size, this information is combined with the user input of the pipe size (diameter) and pressure. These features are passed through a random forest machine learning model that has been trained using data collected via a laboratory setting and flow rate predicted. In some embodiments, this may be performed by the processor 150 of the hand held electronic device 103. In other embodiments, the flow rate may be determined by the node(s) N and an indication (e.g., a value) of the flow rate may be transmitted to the electronic device 103 via its network interface 160.

According to some embodiments, the leak may be a natural gas leak. For example, embodiments of the present invention may be applied to a utility-owned natural gas asset, such as a meter, a regulator, or a connecting pipe and/or fitting. Accordingly, the pipe P may comprise, and/or may be attached to, a utility-owned natural gas asset. As another example, embodiments of the present invention may be applied to a customer-owned natural gas asset, such as a water heater, a stove, and/or a component of heating, ventilation, and air conditioning ("HVAC") system.

In some embodiments, the region R of the pipe P may be adjacent (e.g., within 5 feet, feet, 20 feet, or 100 feet) of the natural gas asset. Moreover, the flow rate of the leak may be a non-zero value that is below 1 SCFH. As an example, the flow rate may be a non-zero value that is below 0.6 SCFH, below 0.4, SCFH, or below 0.2 SCFH.

Figure 3A:
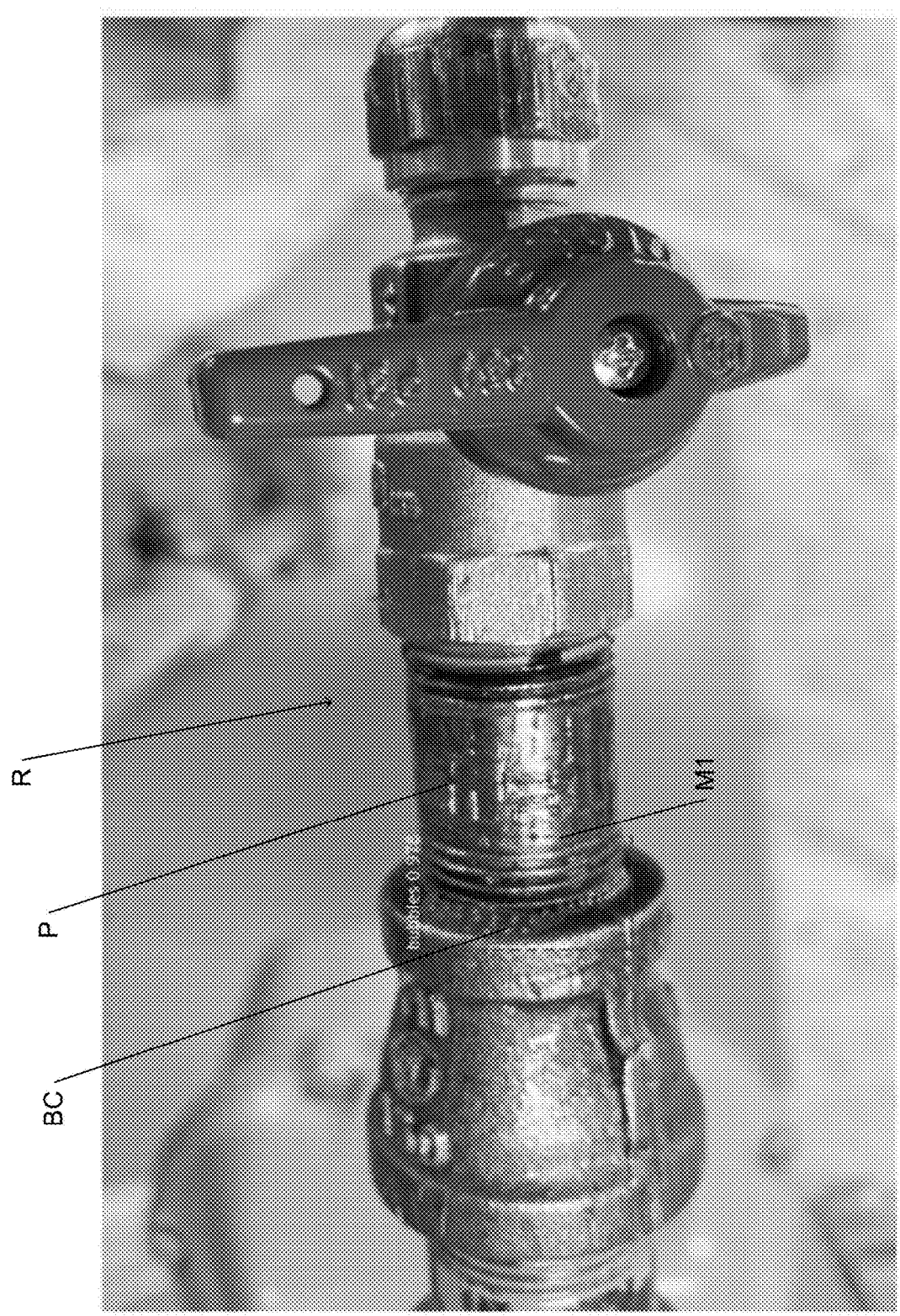
FIGS. 3A and 3B are illustrations of a region of a pipe that can be digitally recorded/captured by the camera of the portable electronic device of FIG. 1A.
Figure 3B:
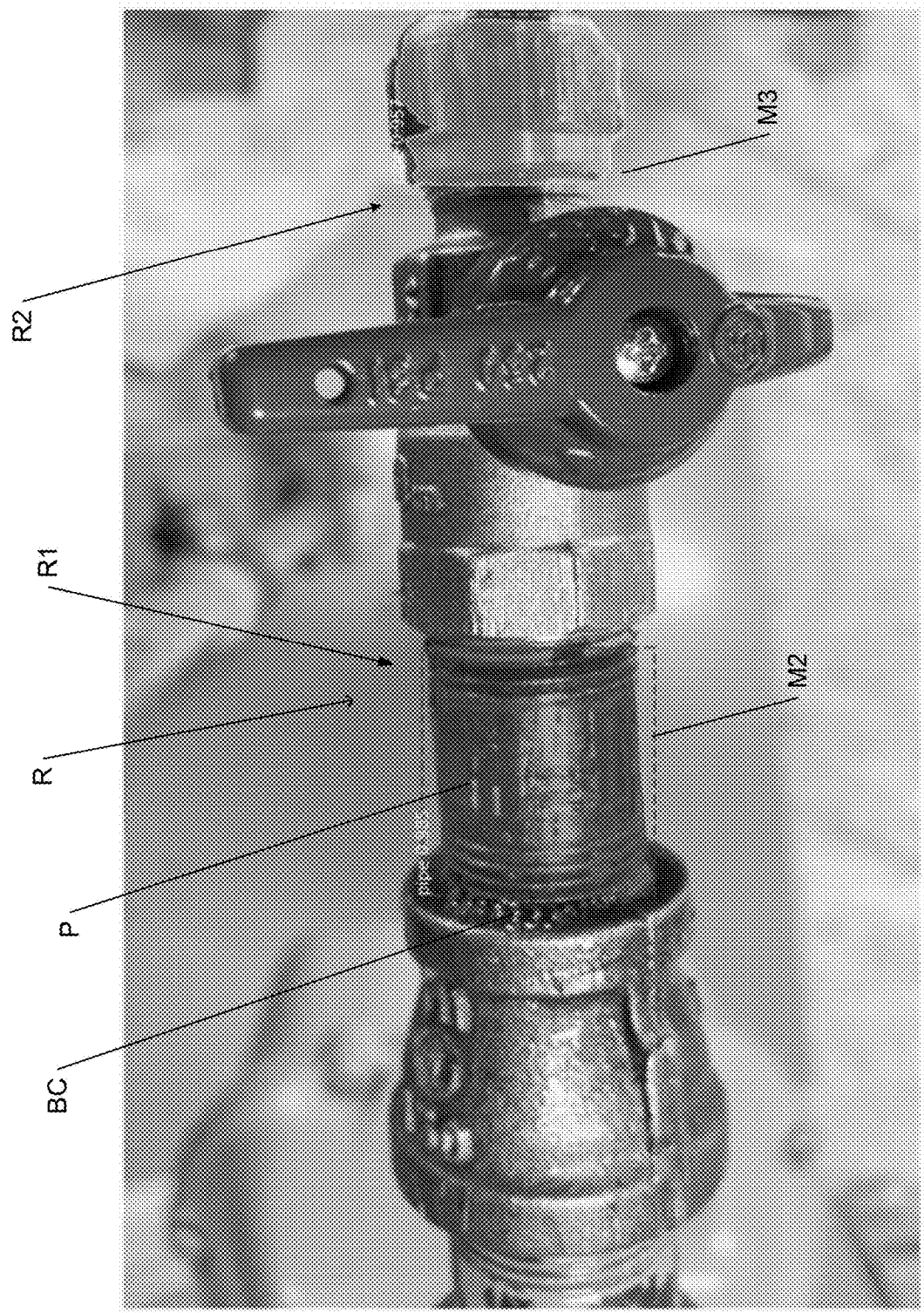

FIGS. 3A and 3B are illustrations of a region R of a pipe P that can be digitally recorded/captured by the camera 140 (FIG. 1B) and identified by the computer vision machine learning model. For example, the views shown in FIGS. 3A and 3B may comprise a digital still image that is derived from a digital video obtained by the camera 140. FIG. 3A illustrates mask M1 created via the computer vision machine learning model for the bubble cluster. FIG. 3B illustrates masks M2, M3 created by the computer vision machine learning model for identifying the pipe.

As shown in FIG. 3A, a soaping procedure performed on the pipe P may result in the formation of a plurality of bubbles on the pipe P. The plurality of bubbles may group together as a bubble cluster BC. A machine-learning model determines a total size (e.g., total surface area) of the bubble cluster BC.

FIG. 3B shows regions R1, R2 that a machine-learning model may consider as candidates for being a portion of the pipe P that is experiencing the leak. For example, the model may determine, as part of an operation of identifying the pipe P, that it has a higher confidence that the region R1, rather than the region R2, is the portion of the pipe P experiencing a leak.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A method of determining a flow rate of a gas leak in a pressurized gas system, the method comprising:
applying a liquid soap solution to a region of a component of the pressurized gas system;
capturing, via a camera of a portable electronic device, a plurality of sequential images of bubbles formed in the region by an interaction between the liquid soap solution and a gas leak from the component;
analyzing the plurality of images via a first algorithm executed by a processor to determine a total area of the bubbles in the region produced by the leak; and
determining, via a second algorithm executed by the processor, a flow rate of the gas leak based on the total area of bubbles in the region, a size of the component, and a pressure of the gas.

2. The method of claim 1, wherein the processor is configured to determine a distance that the camera was spaced apart from the region of the component when capturing the plurality of images, and wherein the processor is configured to account for this distance when determining the total area of bubbles in the region.

3. The method of claim 1, wherein the pressurized gas system is a natural gas system, a propane system, or a refrigerant system.

4. The method of claim 1, wherein the component is a pipe, a valve, or a fitting.

5. The method of claim 1, wherein the plurality of images are a digital video having a duration of at least 10 seconds.

6. The method of claim 1, wherein the first algorithm comprises a first trained machine learning model, and wherein the second algorithm comprises a second trained machine learning model.

7. The method of claim 6, wherein the first trained machine learning model is a computer vision machine learning model, and wherein the second trained machine learning model is a random forest machine learning model.

8. The method of claim 1, wherein the portable electronic device comprises the processor.

9. A method of determining a flow rate of a gas leak in a pressurized gas system, the method comprising:
applying a liquid soap solution to a region of a component of the pressurized gas system;
capturing, via a camera of a portable electronic device, a plurality of sequential images of bubbles formed in the region by an interaction between the liquid soap solution and a gas leak from the component;
entering a value for the pressure of the gas in the pressurized gas system into the portable electronic device;
entering a size of the component into the portable electronic device;
analyzing the plurality of images via a first algorithm executed by a processor to determine a total area of the bubbles in the region produced by the leak; and
determining, via a second algorithm executed by the processor, a flow rate of the gas leak based on the total area of bubbles in the region, the size of the component, and the pressure of the gas.

10. The method of claim 9, wherein the processor is configured to determine a distance that the camera was spaced apart from the region of the component when capturing the plurality of images, and wherein the processor is configured to account for this distance when determining the total area of bubbles in the region.

11. The method of claim 9, wherein the pressurized gas system is a natural gas system, a propane system, or a refrigerant system.

12. The method of claim 9, wherein the component is a pipe, a valve, or a fitting.

13. The method of claim 9, wherein the plurality of images are a digital video having a duration of at least 10 seconds.

14. The method of claim 9, wherein the first algorithm comprises a first trained machine learning model, and wherein the second algorithm comprises a second trained machine learning model.

15. The method of claim 14, wherein the first trained machine learning model is a computer vision machine learning model, and wherein the second trained machine learning model is a random forest machine learning model.

16. The method of claim 9, wherein the portable electronic device comprises the processor.

17. A method of determining a flow rate of a gas leak in a pressurized gas system, the method comprising:
- applying a liquid soap solution to a region of a pipe of the pressurized gas system;
- capturing, via a camera of a portable electronic device, a plurality of sequential images of bubbles formed in the region by an interaction between the liquid soap solution and a gas leak from the component, wherein the plurality of images comprise a digital video having a duration of at least 10 seconds;
- entering a value for the pressure of the gas in the pressurized gas system into the portable electronic device;
- entering a size of the component into the portable electronic device;
- analyzing the plurality of images via a first algorithm executed by a processor to determine a total area of the bubbles in the region produced by the leak; and
- determining, via a second algorithm executed by the processor, a flow rate of the gas leak based on the total area of bubbles in the region, the size of the pipe, and the pressure of the gas in the pressurized gas system.

18. The method of claim 17, wherein the processor is configured to determine a distance that the camera was spaced apart from the region of the pipe when capturing the plurality of images, and wherein the processor is configured to account for this distance when determining the total area of bubbles in the region.

19. The method of claim 17, wherein the pressurized gas system is a natural gas system, a propane system, or a refrigerant system.

20. The method of claim 17, wherein the first algorithm comprises a computer vision machine learning model, and wherein the second algorithm comprises a random forest machine learning model.

* * * * *